US012793395B2

(12) United States Patent
Schulter et al.

(10) Patent No.: US 12,793,395 B2
(45) Date of Patent: Nov. 10, 2026

(54) DETECTION OF RARE AND UNSEEN TRAFFIC PARTICIPANTS AND SCENE ELEMENTS

(71) Applicant: NEC Laboratories America, Inc., Princeton, NJ (US)

(72) Inventors: Samuel Schulter, Long Island City, NY (US); Abhishek Aich, San Jose, CA (US); Manmohan Chandraker, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 18/918,317

(22) Filed: Nov. 6, 2024

(65) Prior Publication Data

US 2025/0218162 A1 Jul. 3, 2025

Related U.S. Application Data

(60) Provisional application No. 63/596,744, filed on Nov. 7, 2023.

(51) Int. Cl.

| | |
|---|---|
| ***G06V 10/774*** | (2022.01) |
| ***G06V 10/74*** | (2022.01) |
| ***G06V 20/54*** | (2022.01) |
| ***G06V 20/58*** | (2022.01) |
| ***G06V 20/70*** | (2022.01) |
| *G06N 20/00* | (2019.01) |

(52) U.S. Cl.

CPC .......... *G06V 10/774* (2022.01); *G06V 10/761* (2022.01); *G06V 20/54* (2022.01); *G06V 20/58* (2022.01); *G06V 20/70* (2022.01); *G06N 20/00* (2019.01)

(58) Field of Classification Search

None

See application file for complete search history.

(56) References Cited

U.S. PATENT DOCUMENTS

| | | | | |
|---|---|---|---|---|
| 2020/0265268 | A1* | 8/2020 | Clayton ................ | G06F 18/254 |
| 2024/0203085 | A1* | 6/2024 | Bangalath ............ | G06T 1/0021 |

OTHER PUBLICATIONS

Arnold et al., "What makes a VRP solution good? The generation of problem-specific knowledge for heuristics." Computers & Operations Research 106 (2019): 280-288. (Year: 2019).*

* cited by examiner

*Primary Examiner* — Phuoc Tran

(74) *Attorney, Agent, or Firm* — Vincent Duffy

(57) ABSTRACT

Systems and methods receive an annotated driving dataset including images capturing driving scenes and annotations including bounding boxes locating objects in the images. An image-caption dataset is obtained including images from common scenes and captions describing the images. A specialized dataset includes data of specific rare or unseen categories. Problem-specific knowledge generates a list of rare or unseen categories. Dataset tuning is performed by applying vision language model (VLM) sub-categorization, cut and paste, image generation, or caption filtering to the annotated driving dataset, the image-caption dataset, and the specialized dataset based on the problem-specific knowledge. A combined dataset includes outputs from the dataset tuning and the annotated driving dataset. A machine learning model is trained using the combined dataset.

20 Claims, 7 Drawing Sheets

DETECTION OF RARE AND UNSEEN TRAFFIC PARTICIPANTS AND SCENE ELEMENTS

RELATED APPLICATION INFORMATION

This application claims priority to U.S. Provisional Patent Application No. 63/596,744 filed on Nov. 7, 2023, incorporated herein by reference in its entirety.

BACKGROUND

Technical Field

The present invention relates to artificial intelligence (AI) systems, and more particularly, to perception models that detect rare and unseen elements in a traffic scene.

Description of the Related Art

Detecting rare and unseen (rare or unseen refers to semantic concepts that have not been seen frequently or at all during training of a machine learning model) traffic participants and scene elements is an ability for self-driving cars to ensure the highest levels of safety in advanced driving assistance systems (ADAS). However, collecting such data for training machine learning models is difficult since these events (or semantic concepts) occur, by definition, rarely. For example, understanding a traffic accident situation can be important, but acquiring such data is challenging at a large scale (compared to non-accident driving situations).

SUMMARY

According to an aspect of the present invention, a computer-implemented method includes receiving an annotated driving dataset including images capturing driving scenes and annotations including bounding boxes locating objects in the images; obtaining an image-caption dataset including images from common scenes and captions describing the images; accessing a specialized dataset including data of specific rare or unseen categories; and generating problem-specific knowledge including a list of rare or unseen categories. Dataset tuning is performed by applying at least one of vision language model (VLM) sub-categorization, cut and paste, image generation, or caption filtering to the annotated driving dataset, the image-caption dataset, and the specialized dataset based on the problem-specific knowledge. A combined dataset is created which includes outputs of the dataset tuning and the annotated driving dataset. A machine learning model is trained using the combined dataset.

According to another aspect of the present invention, a system includes a hardware processor; and a memory storing a computer program. The program when executed by the hardware processor, causes the hardware processor to: receive an annotated driving dataset including images capturing driving scenes and annotations including bounding boxes locating objects in the images; obtain an image-caption dataset including images from common scenes and captions describing the images; access a specialized dataset including data of specific rare or unseen categories; generate problem-specific knowledge including a list of rare or unseen categories; perform dataset tuning by applying at least one of vision language model (VLM) sub-categorization, cut and paste, image generation, or caption filtering to the annotated driving dataset, the image-caption dataset, and the specialized dataset based on the problem-specific knowledge; create a combined dataset including outputs of the dataset tuning and the annotated driving dataset; and train a machine learning model using the combined dataset.

According to another aspect of the present invention, a non-transitory computer-readable storage medium storing instructions that, when executed by a processor, cause the processor to perform a method for synthesizing an image, the method comprising: receiving an annotated driving dataset including images capturing driving scenes and annotations including bounding boxes locating objects in the images; obtaining an image-caption dataset including images from common scenes and captions describing the images; accessing a specialized dataset including data of specific rare or unseen categories; generating problem-specific knowledge including a list of rare or unseen categories; performing dataset tuning by applying at least one of vision language model (VLM) sub-categorization, cut and paste, image generation, or caption filtering to the annotated driving dataset, the image-caption dataset, and the specialized dataset based on the problem-specific knowledge; creating a combined dataset including outputs of the dataset tuning and the annotated driving dataset; and training a machine learning model using the combined dataset.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
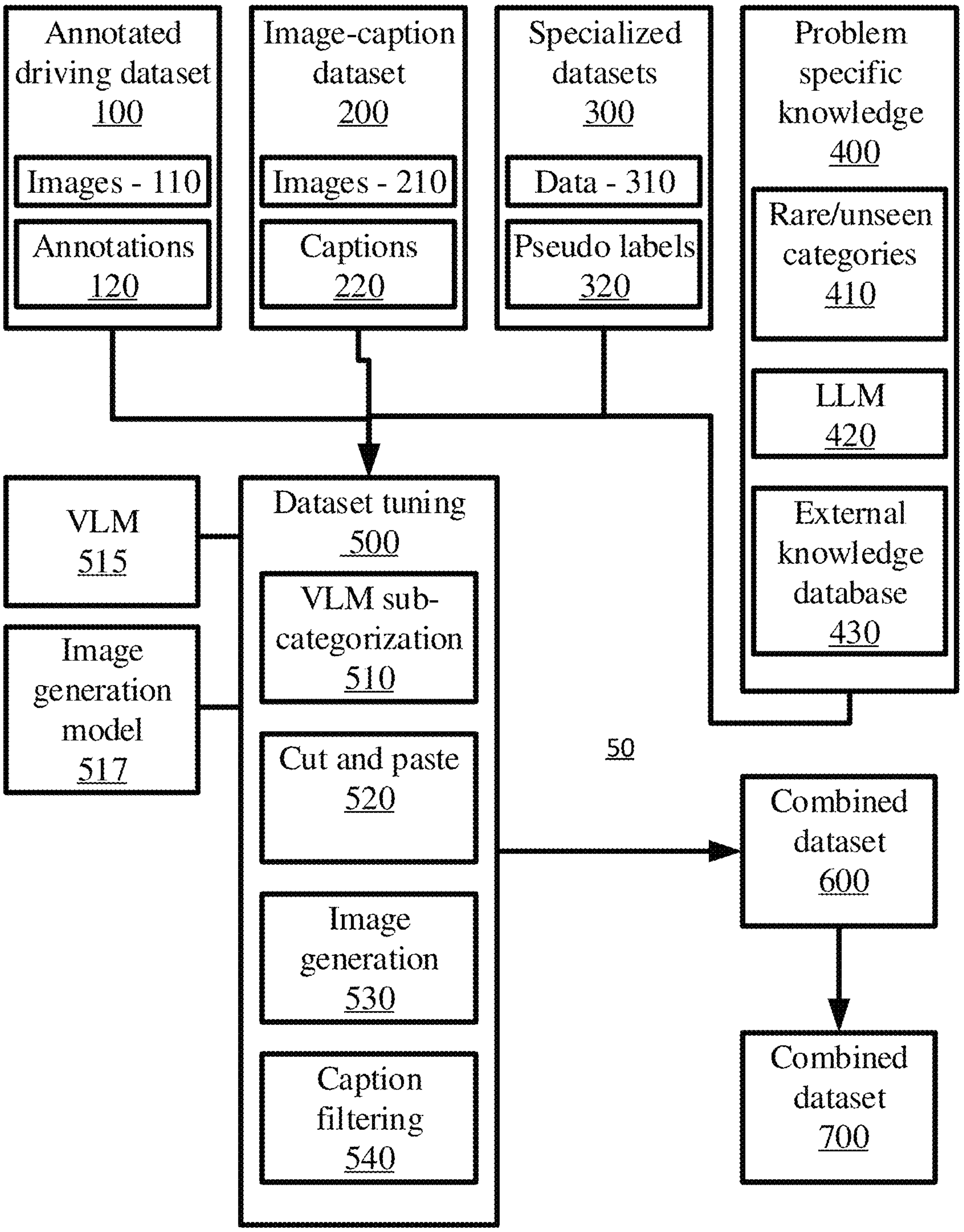
FIG. 1 is a block/flow diagram illustrating a system/method for detection of rare and unseen traffic participants and scene elements, in accordance with an embodiment of the present invention.

In accordance with embodiments of the present invention, systems and methods are described that provide data engineering techniques specifically designed for acquiring data for rare or unseen semantic concepts. Embodiments of the present invention improve the detection of rare and unseen traffic participants and scene elements in self-driving car applications. Collecting sufficient data for training machine learning models to detect rare or unseen events in self-driving scenarios is challenging. The present invention provides systems and methods to augment existing datasets. These systems and methods can include using Vision Language Models (VLMs) to re-label and sub-categorize existing annotations. Image-editing tools can be employed to insert or generate specific semantic concepts into existing datasets. Text-based matching can be employed to filter datasets with image-level captions.

Given existing datasets with annotation for self-driving applications, techniques to re-label, insert, generate or filter the data specifically for rare or unseen categories is provided. This re-purposed data can be used together with the original datasets to train machine learning models for perception in self-driving applications.

Modern autonomous driving systems, or more generally, intelligent mobility services such as advanced driving assistance system (ADAS), rely heavily on data. Deep learning, or artificial intelligence, has been a core technique to enable some of these systems. Deep learning techniques train on a large amount of data and neural networks automatically learn value knowledge for specific tasks. Mobility is a safety-critical area, which means that extensive verification under different scenarios is needed before real deployment. However, collecting real data to cover all possible scenarios with complex traffic scene is difficult, if not impossible, and costly.

Existing Vision Language Models (VLMs) pre-trained on a large corpus of general-purpose data can be employed to re-label (or augment) existing datasets for self-driving. All datasets for self-driving annotate traffic participants and scene elements at a certain semantic level, for example, all trucks or all cars. With VLMs, sub-categorization of trucks into commercial, consumer, public or emergency trucks can be enabled.

Image-editing tools are employed to either paste existing imagery of semantic concepts or to automatically generate specific semantic concepts into existing self-driving datasets. Datasets of specific semantic concepts (e.g., emergency vehicles) can exist but not in the context of self-driving applications. Automatic cut-and-paste techniques are used to insert semantic concepts from dataset A into self-driving datasets B. Alternatively, vision and language generative models can be employed to replace traffic participants or scene elements with other semantic concepts that are rare or unseen. For example, a car standing on a parking lane with an open door, rather than a closed door.

Text-based matching can be employed to filter datasets annotated with image-level captions. Such data exists at large scale for general imagery but is typically not available for driving or road scenes. Given the context of self-driving, along with a known list of rare or unseen semantic concepts, specifically designed keywords can be searched with a specific metric and each image ranked based on a matching score. Limiting the dataset to highest scoring images permits focusing the training of machine learning perception models on data relevant to the task.

In accordance with embodiments of the present invention, automatic asset creation and editing is provided to generate new traffic scenarios without manually creating 3D assets.

Systems and methods are provided that detect rare and unseen traffic participants and scene elements in self-driving car applications. Systems and methods augment existing datasets to improve machine learning models for perception in autonomous driving scenarios. VLMs are employed to re-label and sub-categorize existing annotations. Image-editing tools are employed to insert or generate specific semantic concepts into existing datasets, and utilize text-based matching to filter datasets with image-level captions. Data engineered sequences can be supplied to the training and verification of the autonomous driving systems.

Referring now in detail to the figures in which like-numerals represent the same or similar elements and initially to FIG. 1, a system/method 50 for training artificial intelligence models using rare and unseen traffic participants and scene elements is described and shown in accordance with embodiments of the present invention. An annotated driving dataset 100 includes images 110 that capture driving scenes, captured, e.g., from a car-mounted camera. The dataset 100 includes annotations 120 that come in various forms. In accordance with an embodiment, the annotations 120 include bounding boxes that locate objects in the image from different object categories, e.g., cars, pedestrians, busses, cones, etc.

An image-caption dataset 200 includes images 210 from common scenes. These can include road scenes, but also other domains like indoor office scenes, outdoor events, etc. Also, this dataset 200 includes captions 220, which are free-form text descriptions of a whole image. Specialized datasets 300 include data 310 of specific rare or unseen categories. The data 310 includes images that capture the specific rare or unseen categories and some semantic information of which image contains what semantic category. Optionally, the dataset 300 can provide location information of where these objects are, in the form of segmentation masks. The images need not be captured from a car-mounted camera, but from any camera and any viewpoint, e.g., a mobile-phone picture taken by a pedestrian.

In case the data 310 comes without any location information, pseudo labels 320 can be generated with pre-trained localization models. An assumption that a most salient object in the image is the object of interest is made and a class-agnostic instance segmentation model (pre-trained, publicly available) is run. A largest mask with a confidence above a user-defined threshold is found. The choice of threshold depends on the class-agnostic instance segmentation model, and the choice of which mask to choose depends on the dataset being used. If the images in the dataset often capture other objects than the specific rare or unseen categories, a vision language model (VLM) can be employed to verify which mask captures the desired rare or unseen category. The image is cropped with the bounding box enclosing the mask (enlarged by, e.g., a factor of 1.5), and the VLM is run to get a similarity score between the mask and the specific category names. The highest scoring mask is chosen as the pseudo label 320.

Problem-specific knowledge 400, can be known, curated or gathered. A list 410 of rare or unseen categories can be generated or can be accessed related to an area or subject for which data should be gathered to improve a final ML model 700.

Rare and unseen elements in a traffic scene may include objects, events, or conditions that occur infrequently or have not been previously encountered in typical driving scenarios. These elements can pose challenges for autonomous driving systems and may need specialized detection and handling. Some examples of rare and unseen elements in a traffic scene may include unusual vehicles, such as, emergency vehicles with unique configurations, oversized loads, or specialized construction equipment; unexpected road obstacles, such as, fallen trees, large debris, or sudden sinkholes; uncommon weather conditions, such as, extreme fog, dust storms, or sudden hailstorms; rare wildlife encounters, such as, large animals crossing highways or birds flying at low altitudes; temporary road configurations, such as, construction zones with atypical lane markings or detours; malfunctioning traffic infrastructure, such as, broken traffic lights or damaged road signs; unique pedestrian scenarios, such as people using unconventional mobility devices or engaging in unexpected behaviors; rare traffic incidents, such as, multi-vehicle pileups or overturned vehicles; uncommon road features, such as drawbridges, railroad crossings, or roundabouts in areas where they are not typical; special events, such as, parades, marathons, or other gatherings that alter normal traffic patterns; unusual lighting conditions, such as, solar eclipses, northern lights, or light pollution from nearby events; rare signage, such as, temporary warning signs for unusual hazards or special events; etc.

In some cases, these rare and unseen elements may require autonomous driving systems to adapt their perception and decision-making processes to ensure safe navigation. Synthetic data generation and augmentation techniques may be employed to create diverse training datasets that include these uncommon scenarios, helping to improve the robustness and reliability of autonomous driving systems.

Large-language-models (LLM) 420 can be employed that are instruction fine-tuned or external knowledge bases 430 can be accessed to provide a list of relevant terms for specific categories or situations. For example, the external knowledge base 430 can provide various synonyms or sub-categories for category names, such as, e.g., sub-categories for "emergency vehicle" can include "ambulance", "fire truck", or "police car". With LLMs 420, a prompt can be designed with instructions like "Return a list of phrases and words that are relevant for driving scenes that capture emergency situations", which then may return broader concepts than simple synonyms of "emergency vehicles", like fire hose, fire hydrant, etc. A list of keywords that the describe the problem-specific knowledge 400 results.

A program for dataset tuning 500 includes a set of method or algorithms that leverage data inputs from the annotated driving dataset 100, the image-captain dataset 200, the specialized dataset 300 and the problem-specific knowledge 400 to augment the original dataset.

In block 510, VLM sub-categorization is performed which leverages vision-language-models (VLMs) to sub-categorize existing annotations from the annotated driving dataset 100. A list of potential sub-categories are gathered for a given annotated category via external knowledge bases 430 or via an LLM 420. For certain categories that are annotated in the annotated dataset 100, e.g., "car", a list of sub-categories, like "sedan", "SUV", "sports car", or "cabriolet" are provided. For each bounding box in the annotated dataset 100 that is of that base category, the bounding box is cropped (which can be enlarged a factor, e.g., 1.5) and put the cropped image into the VLM to compute similarities to all sub-categories. This bounding box is pseudo-labeled with the sub-category having a highest similarity, which is in addition to the original base category. This information can then be employed when training a machine learning (ML) model 700 to improve classification (or multi-label classification) capabilities.

A cut and paste method in block 520 can be employed in cases where specialized datasets 300 are involved. The specialized dataset 300 includes images from any domain capturing semantic concepts of interest, along with a segmentation mask (ground truth, or pseudo labeled 320). An image can be taken from the annotated driving dataset 100 and a bounding box picked that matches the semantic concept (e.g., a "van" can match with an "ambulance"). These semantic concepts matches can be defined manually and only need to be defined one time. The semantic concept can be cut from the specialized dataset 300 with the segmentation mask, resized such that it fits the chosen bounding box from the annotated driving dataset 100 and pasted into the bounding box. The semantic label of the bounding box in the annotated driving dataset 100 is then also updated with the specialized semantic concept from the specialized dataset 300, e.g., "van" becomes "ambulance".

In block 530, an image can be generated. Image generation includes taking an image and a bounding box from the annotated driving dataset 100 and using an image generative vision and language model to generate a new image where only the content inside the chosen bounding box has changed to a specified text. Such image-generative models are available and are pre-trained. To change the text, the list of sub-categories can be leveraged again that were obtained from the problem-specific knowledge 400. For example, if the bounding box from the annotated driving dataset 100 has the semantic category "car", the image generative model can be asked to generate an image where this generic car is turned specifically into a "cabriolet". This specialized label can be used for training. Other methods for generating the text instruction for the image-generative model are also contemplated, e.g., a manually curated list can be employed. For example, one can turn a "car" into a "car with an open door".

In block 530, given the image-caption dataset 200, the image-caption dataset 200 is filtered such that only those images remain that are relevant to a list of pre-defined key phrases (e.g., can be individual words or short phrases like "car with open door"). The list of pre-defined key phrases can be generated automatically with LLMs 420 by prompting the model to, for example, "Generate a list of key words that are specifically relevant for road scenes with emergency vehicles". Given one caption and the list of keywords, a score can be computed that indicates how similar the caption matches with the keywords. Based on this score, a top N images can be selected.

To compute the score, the unique set of all n-grams of the caption can be computed. Then, the n-grams that match (e.g., exact text matching) with any of the key phrases are counted. This number is divided by a total number of unique n-grams of the caption. This score is in the range 0 to 1.

The remaining N images (those with highest score) can be used in the training of the ML model 700 in different ways. Depending on the ML model 700, in one embodiment, an image-level loss function is applied that teaches the ML model 700 that the image relates to the text caption (or the words of the text caption). Alternatively, in one embodiment, a pre-trained visual grounding model (e.g., an available and pre-trained model) can be employed to predict a bounding box for each word in the caption. These bounding boxes can then act as pseudo labels and can be used in the model training of ML model 700.

A combined annotated dataset 600 includes outputs of the dataset tuning 500 and the original annotated dataset 100. The combined annotated dataset 600 will be employed for model training. The machine learning (ML) model 700 is trained with the combined annotated dataset 600 as input.

As employed herein, the ML model 700 has been described and can include a feedforward artificial neural network, consisting of fully connected neurons to distinguish data. Artificial machine learning systems can be employed in accordance with embodiments of the present invention to predict outputs or outcomes based on input data, e.g., image data. For example, the ML model 700 can be implemented to generate images for deep neural network training of self-driving vehicles. Other embodiments include images synthesis for training models in other industries including but not limited to anomaly detection for inspection machines, etc.

In some embodiments, the ML model 700 includes an artificial neural network (ANN). One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

The present embodiments may take any appropriate form, including any number of layers and any pattern or patterns of connections therebetween. ANNs demonstrate an ability to derive meaning from complicated or imprecise data and can be used to extract patterns and detect trends that are too complex to be detected by humans or other computer-based systems. The structure of a neural network is known generally to have input neurons that provide information to one or more "hidden" neurons. Connections between the input neurons and hidden neurons are weighted, and these weighted inputs are then processed by the hidden neurons according to some function in the hidden neurons. There can be any number of layers of hidden neurons, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. A set of output neurons accepts and processes weighted input from the last set of hidden neurons.

This represents a "feed-forward" computation, where information propagates from input neurons to the output neurons. Upon completion of a feed-forward computation, the output is compared to a desired output available from training data. The error relative to the training data is then processed in "backpropagation" computation, where the hidden neurons and input neurons receive information regarding the error propagating backward from the output neurons. Once the backward error propagation has been completed, weight updates are performed, with the weighted connections being updated to account for the received error. It should be noted that the three modes of operation, feed forward, back propagation, and weight update, do not overlap with one another. This represents just one variety of ANN computation, and that any appropriate form of computation may be used instead. In the present case the output neurons provide emission information for a given plot of land provided from the input of satellite or other image data.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output or target. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set or target, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight may be characterized as a weight value that is stored in a computer memory, and the activation function of each neuron may be implemented by a computer processor. The weight value may store any appropriate data value, such as a real number, a binary value, or a value selected from a fixed number of possibilities, which is multiplied against the relevant neuron outputs. Alternatively, the weights may be implemented as resistive processing units (RPUs), generating a predictable current output when an input voltage is applied in accordance with a settable resistance.

A neural network becomes trained by exposure to empirical data. During training, the neural network stores and adjusts a plurality of weights that are applied to the incoming empirical data. By applying the adjusted weights to the data, the data can be identified as belonging to a particular predefined class from a set of classes or a probability that the input data belongs to each of the classes can be output.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

A deep neural network, such as a multilayer perceptron, can have an input layer of source nodes, one or more computation layer(s) having one or more computation nodes, and an output layer, where there is a single output node for each possible category into which the input example could be classified. An input layer can have a number of source nodes equal to the number of data values in the input data. The computation nodes in the computation layer(s) can also be referred to as hidden layers because they are between the source nodes and output node(s) and are not directly observed. Each node in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the input data. A deep neural network can be fully connected, where each node in a computational layer is connected to all other nodes in the previous layer, or may have other configurations of connections between layers. If links between nodes are missing, the network is referred to as partially connected.

Figure 2:
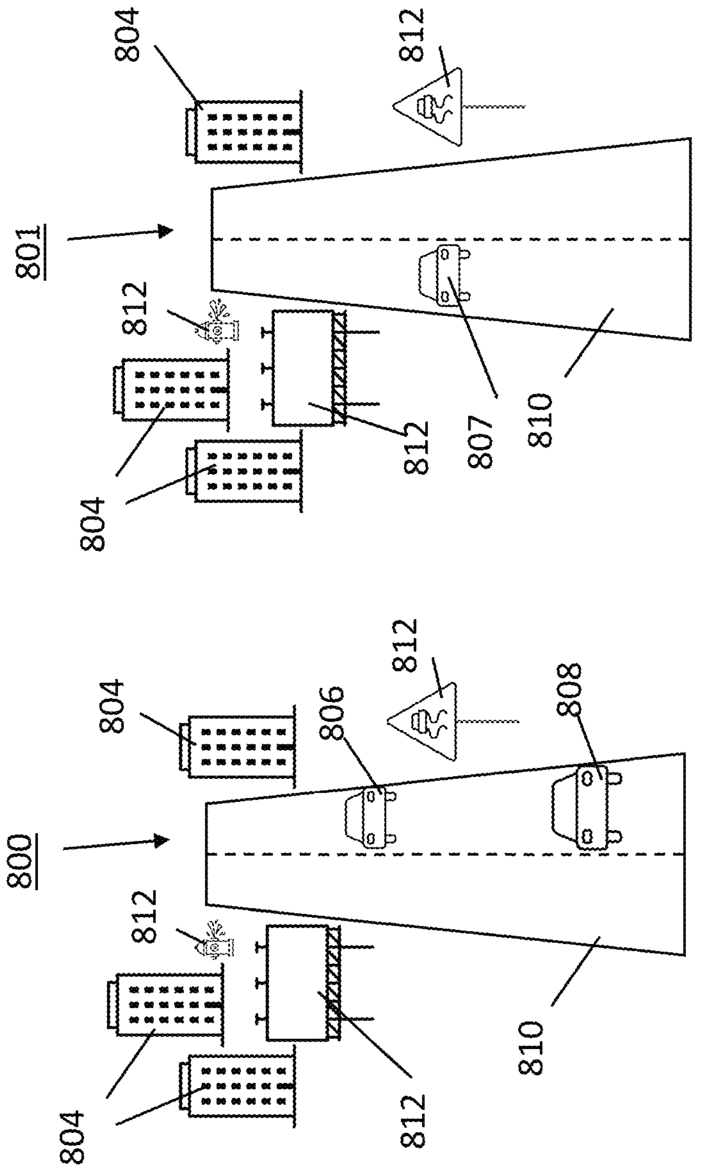
FIG. 2 is a schematic diagram showing a synthesized scene that can be generated to train a machine learning model, in accordance with an embodiment of the present invention.

Referring to FIG. 2, an example of a synthesized image generated in accordance with systems described herein is shown. A scene of a reference image 800 includes buildings 804 or other structures and a number of vehicles 806 and 808, which can be in motion. A synthesized image 801 generated in accordance with the present embodiments includes images of a vehicle 807 (added agent) that accurately portrays a realistic image of static objects 812, buildings 804, dynamic objects and accurately accounts for the background. Here, the vehicle 807 is generated on the left side of a road 810 at a different depth when compared to the vehicles 806, 808 of the reference image 800. By being able to generate synthetic images with accurate depth, model training data can more easily be generated with labels without human interaction.

Synthetic images can be employed for training systems with little human intervention. Synthetic images can enable self-training and help to account for novel occurrences and objects in a scene. Other applications can include inspection machines in a manufacturing environment, computer vision, cyber security applications, etc.

Figure 3:
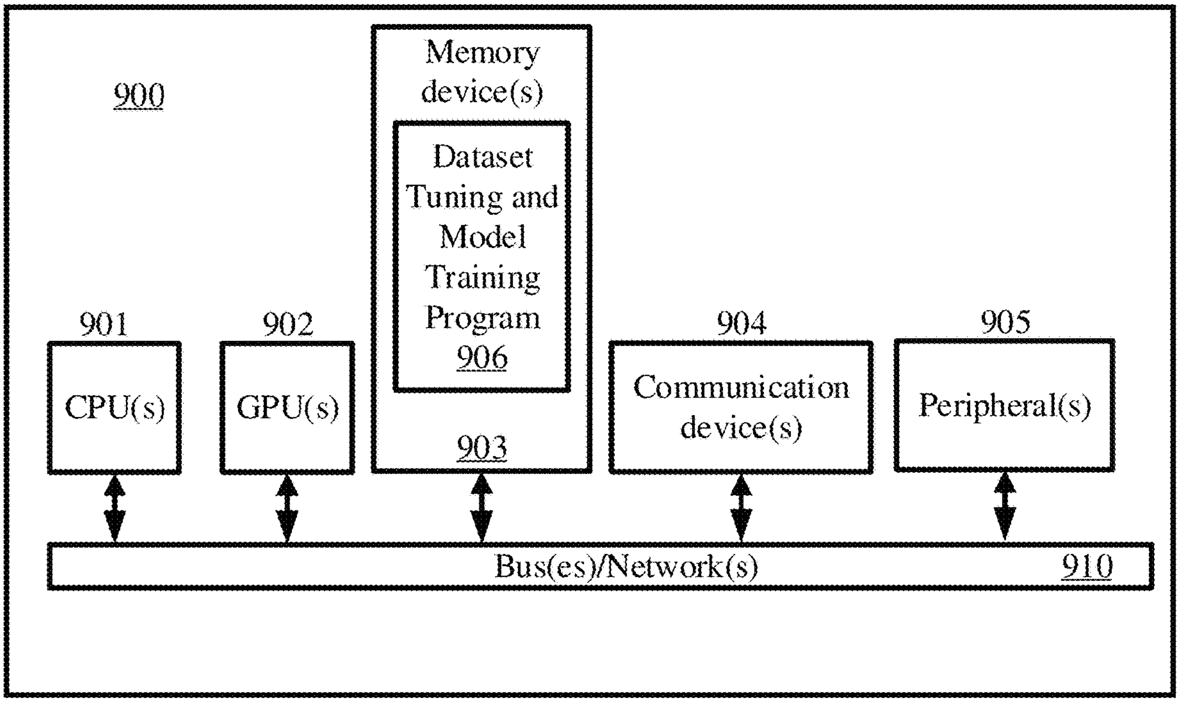
FIG. 3 is a block/flow diagram illustrating a system/method for dataset tuning and model training, in accordance with an embodiment of the present invention.

Referring to FIG. 3, a block diagram is shown for an exemplary processing system 900, in accordance with an embodiment of the present invention. The processing system 900 includes a set of processing units (e.g., CPUs) 901, a set of GPUs 902, a set of memory devices 903, a set of communication devices 904, and a set of peripherals 905. The CPUs 901 can be single or multi-core CPUs. The GPUs 902 can be single or multi-core GPUs. The one or more memory devices 903 can include caches, RAMs, ROMs, and other memories (flash, optical, magnetic, etc.). The communication devices 904 can include wireless and/or wired communication devices (e.g., network (e.g., WIFI, etc.) adapters, etc.). The peripherals 905 can include a display device, a user input device, a printer, an imaging device, and so forth. Elements of processing system 900 are connected by one or more buses or networks (collectively denoted by the figure reference numeral 910).

In an embodiment, memory devices 903 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 903 store program code or software 906 for implementing one or more functions of the systems and methods described herein. The software 906 can include one or more programs for dataset tuning and model training of a ML model. Of course, the processing system 900 may also include other elements (not shown), as readily contemplated by one of skill in the art, as well as omitting certain elements. For example, various other input devices and/or output devices can be included in processing system 900, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 900 are readily contemplated by one of ordinary skill in the art given the teachings of the present invention provided herein.

Moreover, it is to be appreciated that various figures as described with respect to various elements and steps relating to the present invention that may be implemented, in whole or in part, by one or more of the elements of system 900.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs). These and other variations of a hardware processor subsystem are also contemplated in accordance with embodiments of the present invention.

Figure 4:
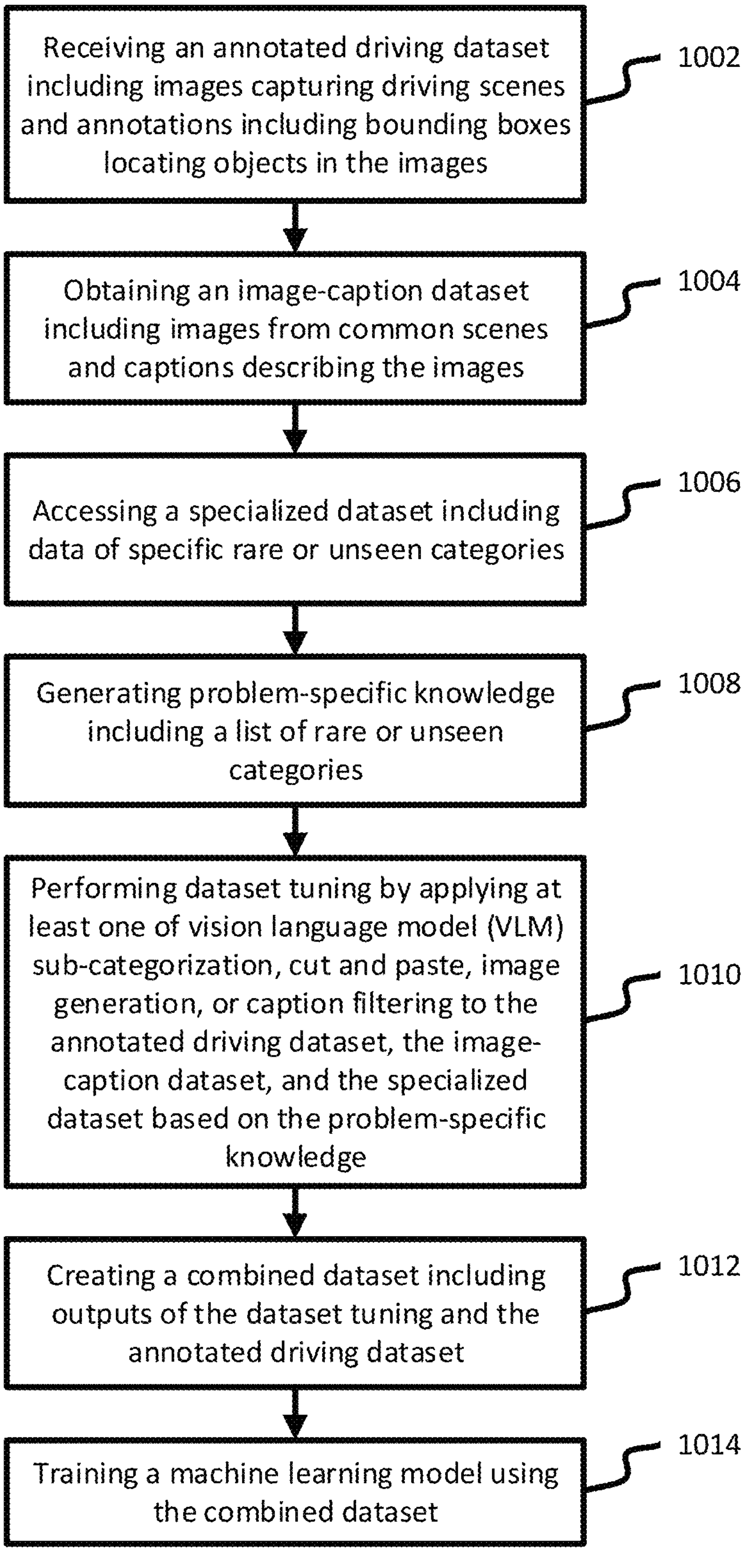
FIG. 4 is a flow diagram illustrating methods for training a model for detection of rare and unseen traffic participants and scene elements, in accordance with an embodiment of the present invention.

Referring to FIG. 4, computer-implemented methods for training a model and synthesizing an image are described in accordance with embodiments of the present invention. In block 1002, an annotated driving dataset is provided and received that includes images that capture driving scenes and annotations including bounding boxes locating objects in the images. In block 1004, an image-caption dataset is obtained that includes images from common scenes and captions describing the images. In block 1006, a specialized dataset is accessed that includes data of specific rare or unseen categories. In block 1008, problem-specific knowledge is generated that includes a list of rare or unseen categories. In block 1010, dataset tuning is performed by applying at least one of vision language model (VLM) sub-categorization, cut and paste, image generation, or caption filtering to the annotated driving dataset, the image-caption dataset, and the specialized dataset based on the problem-specific knowledge.

In block 1012, a combined dataset is created including outputs of the dataset tuning and the annotated driving dataset. In block 1014, a machine learning model is trained using the combined dataset.

Figure 5:
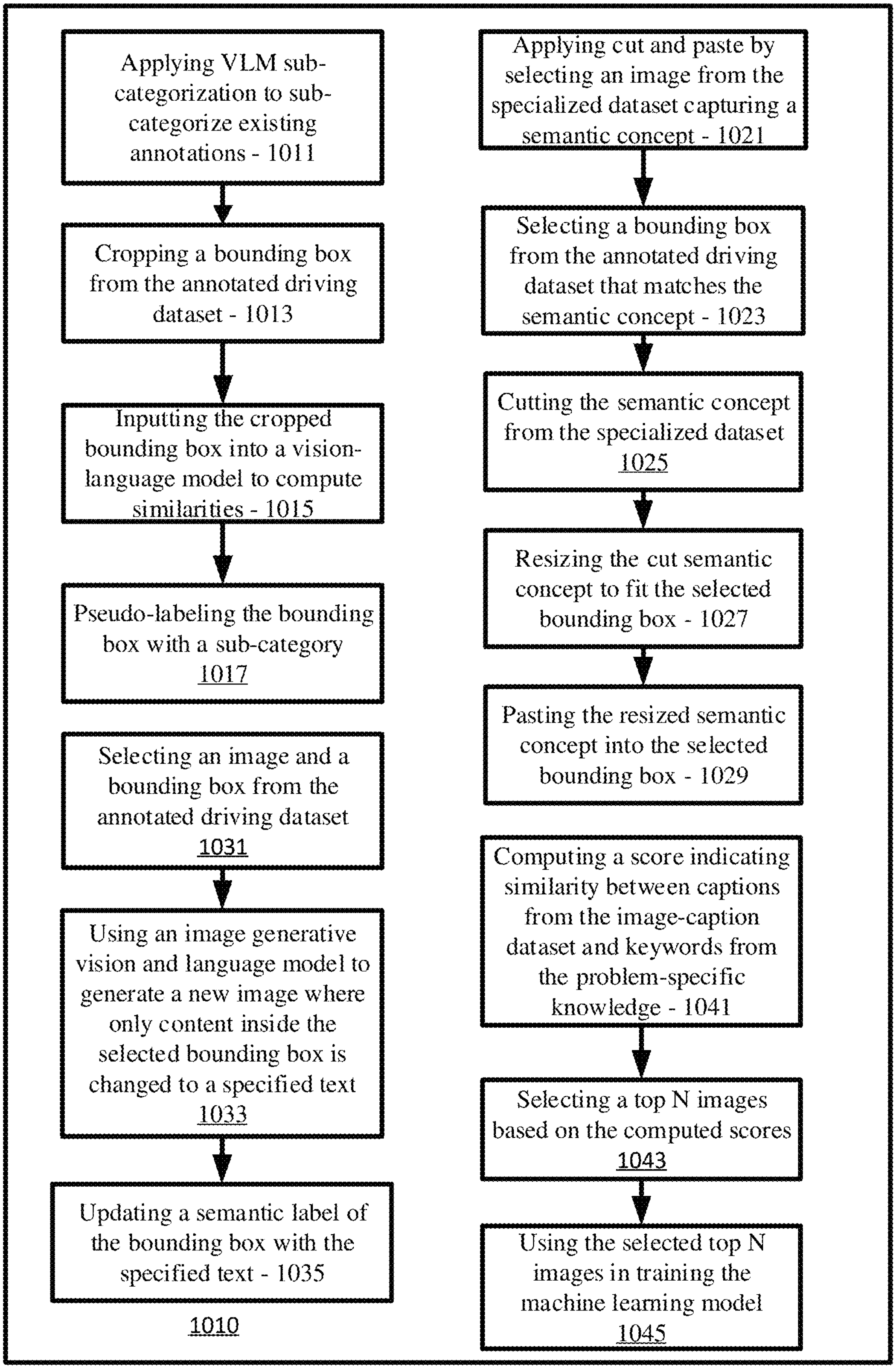
FIG. 5 is a flow diagram illustrating methods for dataset tuning, in accordance with an embodiment of the present invention.

Referring to FIG. 5, the data tuning in block 1010 can further include one or more of the following. In block 1011, the dataset tuning can apply VLM sub-categorization to sub-categorize existing annotations from the annotated driving dataset using a list of potential sub-categories gathered from external knowledge bases or large language models. The VLM sub-categorization can include cropping a bounding box from the annotated driving dataset in block 1013; inputting the cropped bounding box into a vision-language model to compute similarities to all sub-categories in block 1015; and pseudo-labeling the bounding box with a sub-category having a highest similarity in block 1017.

The dataset tuning can apply cut and paste by selecting an image from the specialized dataset capturing a semantic concept of interest in block 1021; selecting a bounding box from the annotated driving dataset that matches the semantic concept in block 1023; cutting the semantic concept from the specialized dataset in block 1025; resizing the cut semantic concept to fit the selected bounding box in block 1027; and pasting the resized semantic concept into the selected bounding box in block 1029.

The dataset tuning can apply image generation by selecting an image and a bounding box from the annotated driving dataset in block 1031; using an image generative vision and language model to generate a new image where only content inside the selected bounding box is changed to a specified text in block 1033; and updating a semantic label of the bounding box with the specified text in block 1035.

The dataset tuning can apply caption filtering by computing a score indicating similarity between captions from the image-caption dataset and keywords from the problem-specific knowledge in block 1041; selecting a top N images based on the computed scores in block 1043; and using the selected top N images in training the machine learning model in block 1045.

Figure 6:
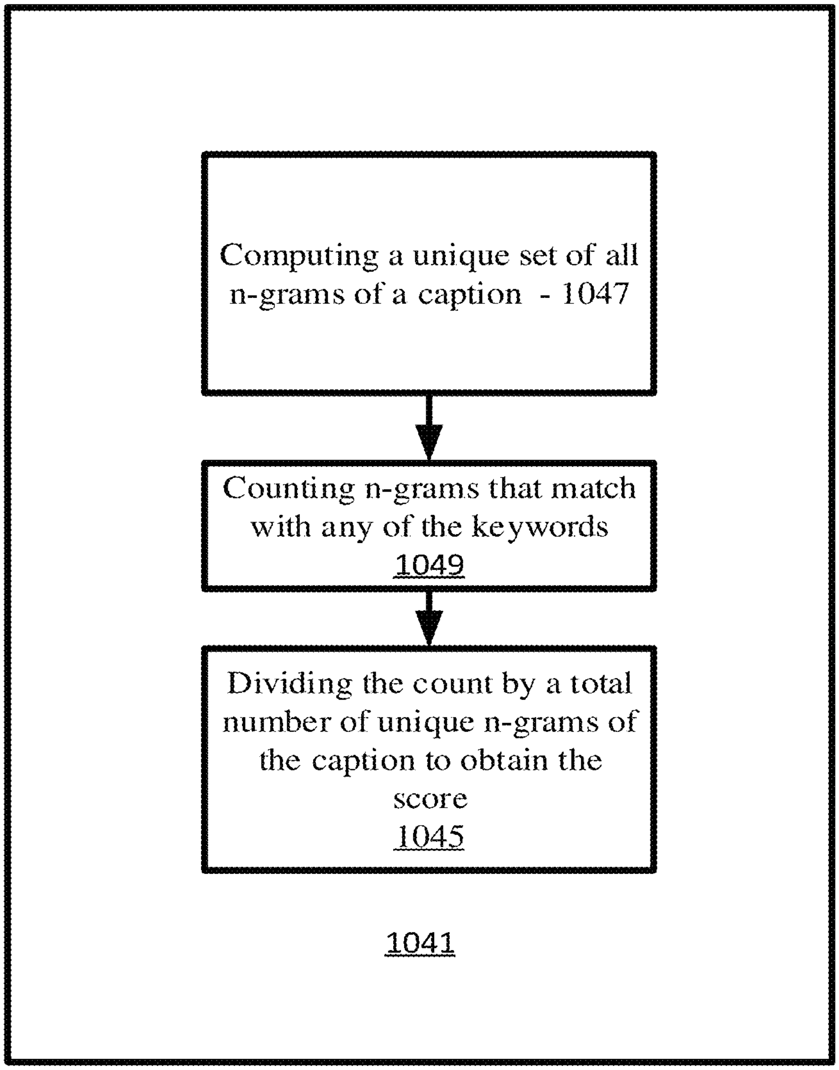
FIG. 6 is a flow diagram illustrating a method for computing a similarity score, in accordance with an embodiment of the present invention.

Referring to FIG. 6, computing the score in block 1041 can include: computing a unique set of all n-grams of a caption in block 1047; counting n-grams that match with any of the keywords in block 1049; and dividing the count by a total number of unique n-grams of the caption to obtain the score in block 1051.

Figure 7:
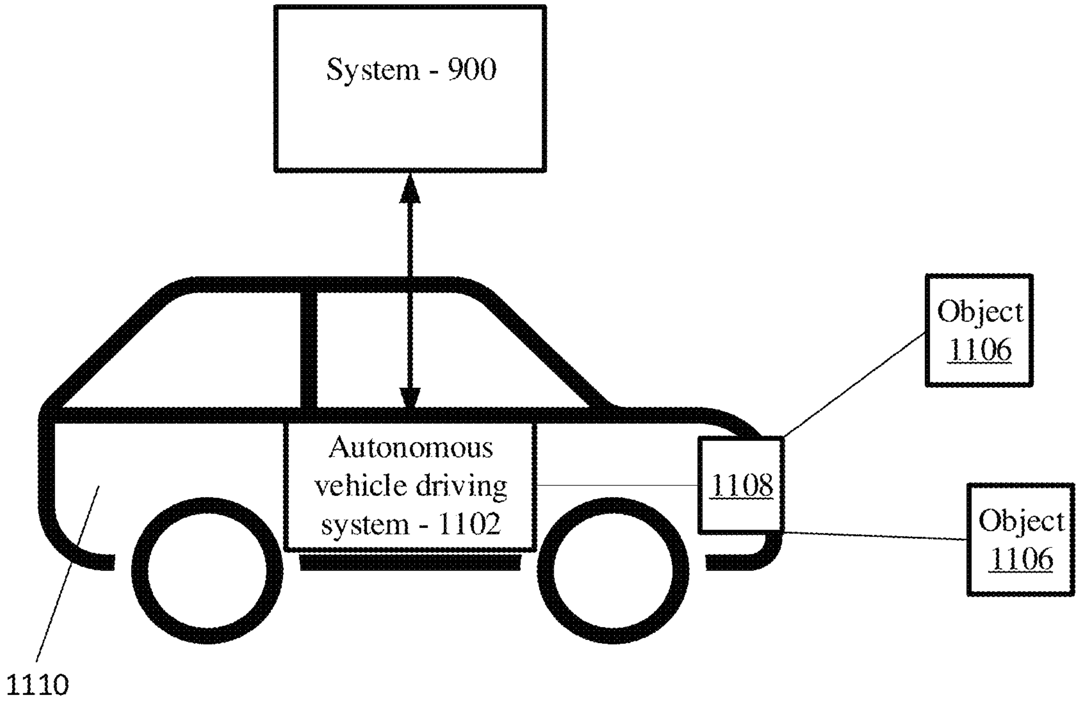
FIG. 7 is a schematic diagram showing an autonomous vehicle system which employs self-training of a machine learning model using synthesized images with rare and unseen traffic participants and scene elements, in accordance with embodiments of the present invention.

Referring to FIG. 7 with reference to FIG. 3, embodiments of the present invention can be employed in any number of practical applications. A self-training system can be employed in any computer vision scenario. A self-training system that generates synthesized images in a perception model can also be employed in any computer vision scenario. These systems can be employed in autonomous driving applications. In an embodiment, a vehicle 1110 can include an autonomous driving system 1102 (e.g., Advanced Driving Assistance System (ADAS)). The autonomous driving system 1102 includes one or more sensors 1108 that are configured to perceive objects 1106 with which the vehicle 1110 will encounter. The autonomous driving system 1102 can employ computer vision to detect the objects and respond by avoiding them.

The autonomous driving system 1102 can interact with or be a part of system 900, which includes software 906 (FIG. 3). Software 906 can employ collected data for dataset tuning to generate synthetic images for training or retraining an ML model. Software 906 can be distributed or can exist on the vehicle 1110 or remotely from the vehicle 1110 and be accessible over a network, such as, e.g., the Cloud/internet, etc.

Since the system 900 is self-training, the system 900 can be employed concurrently with other functions of the autonomous driving system 1102. For example, while avoiding objects 1106, the system 900 can be learning at the same time to improve performance by synthesizing images for training. In addition, perception models can be improved by using the novel objects to determine any deficiencies in the models' ability to correctly predict objects.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method, comprising:

receiving an annotated driving dataset including images capturing driving scenes and annotations including bounding boxes locating objects in the images;

obtaining an image-caption dataset including images from common scenes and captions describing the images;

accessing a specialized dataset including data of specific rare or unseen categories;

generating problem-specific knowledge including a list of rare or unseen categories;

performing dataset tuning by applying at least one of vision language model (VLM) sub-categorization, cut and paste, image generation, or caption filtering to the annotated driving dataset, the image-caption dataset, and the specialized dataset based on the problem-specific knowledge;

creating a combined dataset including outputs of the dataset tuning and the annotated driving dataset; and training a machine learning model using the combined dataset.

2. The method of claim 1, wherein performing dataset tuning comprises applying VLM sub-categorization to sub-categorize existing annotations from the annotated driving dataset using a list of potential sub-categories gathered from external knowledge bases or large language models.

3. The method of claim 2, wherein applying VLM sub-categorization comprises:

cropping a bounding box from the annotated driving dataset;

inputting the bounding box into a vision-language model to compute similarities to all sub-categories; and pseudo-labeling the bounding box with a sub-category having a highest similarity.

4. The method of claim 1, wherein performing dataset tuning comprises applying cut and paste by:

selecting an image from the specialized dataset capturing a semantic concept of interest;

selecting a bounding box from the annotated driving dataset that matches the semantic concept;

cutting the semantic concept from the specialized dataset;

resizing the semantic concept to fit the bounding box; and pasting the semantic concept into the bounding box.

5. The method of claim 1, wherein performing dataset tuning comprises applying image generation by:

selecting an image and a bounding box from the annotated driving dataset;

using an image generative vision and language model to generate a new image where only content inside the bounding box is changed to a specified text; and updating a semantic label of the bounding box with the specified text.

6. The method of claim 1, wherein performing dataset tuning comprises applying caption filtering by:

computing scores indicating similarity between captions from the image-caption dataset and keywords from the problem-specific knowledge;

selecting a top N images based on the scores; and using the top N images in training the machine learning model.

7. The method of claim 6, wherein computing the scores comprises:

computing a unique set of all n-grams of a caption;

counting n-grams that match with any of the keywords; and dividing a count of the n-grams by a total number of unique n-grams of the caption to obtain the scores.

8. A system, comprising:

a hardware processor; and a memory storing a computer program which, when executed by the hardware processor, causes the hardware processor to:

receive an annotated driving dataset including images capturing driving scenes and annotations including bounding boxes locating objects in the images;

obtain an image-caption dataset including images from common scenes and captions describing the images;

access a specialized dataset including data of specific rare or unseen categories;

generate problem-specific knowledge including a list of rare or unseen categories;

perform dataset tuning by applying at least one of vision language model (VLM) sub-categorization, cut and paste, image generation, or caption filtering to the annotated driving dataset, the image-caption dataset, and the specialized dataset based on the problem-specific knowledge;

create a combined dataset including outputs of the dataset tuning and the annotated driving dataset; and train a machine learning model using the combined dataset.

9. The system of claim 8, wherein performing dataset tuning comprises applying VLM sub-categorization to sub-categorize existing annotations from the annotated driving dataset using a list of potential sub-categories gathered from external knowledge bases or large language models.

10. The system of claim 9, wherein applying VLM sub-categorization comprises:

cropping a bounding box from the annotated driving dataset;

inputting the bounding box into a vision-language model to compute similarities to all sub-categories; and pseudo-labeling the bounding box with a sub-category having a highest similarity.

11. The system of claim 8, wherein performing dataset tuning comprises applying cut and paste by:

selecting an image from the specialized dataset capturing a semantic concept of interest;

selecting a bounding box from the annotated driving dataset that matches the semantic concept;

cutting the semantic concept from the specialized dataset;

resizing the semantic concept to fit the bounding box; and pasting the semantic concept into the bounding box.

12. The system of claim 8, wherein performing dataset tuning comprises applying image generation by:

selecting an image and a bounding box from the annotated driving dataset;

using an image generative vision and language model to generate a new image where only content inside the bounding box is changed to a specified text; and updating a semantic label of the bounding box with the specified text.

13. The system of claim 8, wherein performing dataset tuning comprises applying caption filtering by:

computing scores indicating similarity between captions from the image-caption dataset and keywords from the problem-specific knowledge;

selecting a top N images based on the scores; and using the top N images in training the machine learning model.

14. The system of claim 13, wherein computing the scores comprises:

computing a unique set of all n-grams of a caption;

counting n-grams that match with any of the keywords; and dividing a count of the n-grams by a total number of unique n-grams of the caption to obtain the scores.

15. A non-transitory computer-readable storage medium storing instructions that, when executed by a processor, cause the processor to perform a method for synthesizing an image, the method comprising:

receiving an annotated driving dataset including images capturing driving scenes and annotations including bounding boxes locating objects in the images;

obtaining an image-caption dataset including images from common scenes and captions describing the images;

accessing a specialized dataset including data of specific rare or unseen categories;

generating problem-specific knowledge including a list of rare or unseen categories;

performing dataset tuning by applying at least one of vision language model (VLM) sub-categorization, cut and paste, image generation, or caption filtering to the annotated driving dataset, the image-caption dataset, and the specialized dataset based on the problem-specific knowledge;

creating a combined dataset including outputs of the dataset tuning and the annotated driving dataset; and training a machine learning model using the combined dataset.

16. The non-transitory computer-readable storage medium of claim 15, wherein performing dataset tuning comprises applying VLM sub-categorization by:

cropping a bounding box from the annotated driving dataset;

inputting the bounding box into a vision-language model to compute similarities to all sub-categories; and pseudo-labeling the bounding box with a sub-category having a highest similarity.

17. The non-transitory computer-readable storage medium of claim 15, wherein performing dataset tuning comprises applying cut and paste by:

selecting an image from the specialized dataset capturing a semantic concept of interest;

selecting a bounding box from the annotated driving dataset that matches the semantic concept;

cutting the semantic concept from the specialized dataset;

resizing the semantic concept to fit the bounding box; and pasting the semantic concept into the bounding box.

18. The non-transitory computer-readable storage medium of claim 15, wherein performing dataset tuning comprises applying image generation by:

selecting an image and a bounding box from the annotated driving dataset;

using an image generative vision and language model to generate a new image where only content inside the bounding box is changed to a specified text; and updating a semantic label of the bounding box with the specified text.

19. The non-transitory computer-readable storage medium of claim 15, wherein performing dataset tuning comprises applying caption filtering by:

computing scores indicating similarity between captions from the image-caption dataset and keywords from the problem-specific knowledge;

selecting a top N images based on the scores; and using the top N images in training the machine learning model.

20. The non-transitory computer-readable storage medium of claim 19, wherein computing the scores comprises:

computing a unique set of all n-grams of a caption;

counting n-grams that match with any of the keywords; and dividing a count of the n-grams by a total number of unique n-grams of the caption to obtain the scores.

* * * * *